(12) United States Patent
Xu et al.

(10) Patent No.: US 10,353,478 B2
(45) Date of Patent: Jul. 16, 2019

(54) HOVER TOUCH INPUT COMPENSATION IN AUGMENTED AND/OR VIRTUAL REALITY

(71) Applicant: Google Inc., Mountain View, CA (US)

(72) Inventors: Zhaoyang Xu, Mountain View, CA (US); Christian Plagemann, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 207 days.

(21) Appl. No.: 15/450,927

(22) Filed: Mar. 6, 2017

(65) Prior Publication Data

US 2018/0004297 A1    Jan. 4, 2018

Related U.S. Application Data

(60) Provisional application No. 62/356,193, filed on Jun. 29, 2016.

(51) Int. Cl.
| | |
|---|---|
| *G06F 3/01* | (2006.01) |
| *G06F 3/044* | (2006.01) |
| *G06T 19/00* | (2011.01) |
| *G06F 3/041* | (2006.01) |
| *G06F 3/0488* | (2013.01) |

(52) U.S. Cl.
CPC .............. *G06F 3/017* (2013.01); *G06F 3/011* (2013.01); *G06F 3/044* (2013.01); *G06F 3/0418* (2013.01); *G06F 3/04883* (2013.01); *G06T 19/006* (2013.01); *G06F 2203/04101* (2013.01)

(58) Field of Classification Search
CPC ............... G06F 3/017; G06F 3/044; G06F 2203/04101; G06T 19/006
See application file for complete search history.

(56) References Cited

U.S. PATENT DOCUMENTS

| | | |
|---|---|---|
| 7,379,562 B2 | 5/2008 | Wilson et al. |
| 8,479,122 B2 | 7/2013 | Huppi et al. |
| 9,081,450 B1 * | 7/2015 | Mohindra ............... G06F 3/044 |

(Continued)

FOREIGN PATENT DOCUMENTS

| | | |
|---|---|---|
| EP | 2916202 A1 | 9/2015 |
| EP | 2923232 A1 | 9/2015 |
| WO | 2016/044807 A1 | 3/2016 |

OTHER PUBLICATIONS

Innvitation to Pay Additional Fees and Partial Search Report for PCT Patent Application No. PCT/US2017/021152, dated Jun. 8, 2017, 15 pages.

(Continued)

*Primary Examiner* — Vinh T Lam

(74) *Attorney, Agent, or Firm* — Brake Hughes Bellermann LLP

(57) ABSTRACT

A hover touch compensation system and method may detect and track a hover position of a pointing/selecting device, such as a user's finger, relative to an input surface of a user interface, and may detect a point at which the pointing/selecting device initiates a movement toward the input surface of the user interface. The system may identify an intended contact point on the user interface based on the hover position of the pointing/selecting device relative to the input surface of the user interface at the point at which the movement toward the user interface is detected.

16 Claims, 11 Drawing Sheets

(56) References Cited

U.S. PATENT DOCUMENTS

| | | | |
|---|---|---|---|
| 2012/0169646 A1 | 7/2012 | Berkes et al. | |
| 2013/0222329 A1 | 8/2013 | Larsby et al. | |
| 2013/0328832 A1* | 12/2013 | Boumgarten | G06F 3/0418 345/174 |
| 2014/0152539 A1* | 6/2014 | Cai | G06F 3/011 345/156 |
| 2014/0267094 A1 | 9/2014 | Hwang et al. | |
| 2014/0272866 A1* | 9/2014 | Kim | G09B 23/28 434/262 |
| 2014/0306891 A1* | 10/2014 | Latta | G06F 3/017 345/158 |
| 2015/0177866 A1* | 6/2015 | Hwang | G06F 3/042 345/175 |
| 2015/0199101 A1 | 7/2015 | Viswanathan et al. | |
| 2015/0206329 A1* | 7/2015 | Devries | G06F 16/583 345/633 |
| 2016/0202840 A1* | 7/2016 | Ichihara | G06F 3/0418 345/174 |
| 2016/0239080 A1* | 8/2016 | Marcolina | G06F 3/011 |
| 2016/0357281 A1* | 12/2016 | Fleizach | H04N 3/155 |
| 2017/0017344 A1* | 1/2017 | Kuribayashi | G06F 3/0418 |
| 2017/0153728 A1* | 6/2017 | Takahashi | G06F 3/041 |
| 2017/0192465 A1* | 7/2017 | Lazaridis | G06F 1/1662 |

OTHER PUBLICATIONS

International Search Report and Written Opinion for PCT Patent Application No. PCT/US2017/021152, dated Aug. 2, 2017, 22 pages.

* cited by examiner

HOVER TOUCH INPUT COMPENSATION IN AUGMENTED AND/OR VIRTUAL REALITY

CROSS REFERENCE TO RELATED APPLICATION

This application is a Non-Provisional of, and claims priority to, U.S. Provisional Application No. 62/356,193, filed on Jun. 29, 2016, the disclosure of which is incorporated by reference herein in its entirety.

FIELD

This document relates, generally, to compensation in a hover touch input in an augmented reality environment and/or a virtual reality environment.

BACKGROUND

An augmented reality (AR) system and/or a virtual reality (VR) system may generate a three-dimensional (3D) immersive augmented and/or virtual reality environment. A user may experience this virtual environment through interaction with various electronic devices. For example, a helmet or other head mounted device including a display, glasses, goggles and the like that a user looks through, either when viewing a display device or when viewing the ambient environment, may provide audio and visual elements of the virtual environment to be experienced by a user. A user may move through and interact with virtual elements in the virtual environment through, for example, hand/arm gestures, manipulation of external devices operably coupled to the head mounted device, such as for example handheld controllers, gloves fitted with sensors, and other such electronic devices. Physical separation of the external device (at which a user may input various selections to be carried out in the virtual environment) from the head mounted device in which the virtual environment is displayed, may cause inconsistency in how the input is executed in the virtual environment.

SUMMARY

In one aspect, a computer-implemented method may include tracking a hover position of a pointing device within a detecting zone of a user interface; mapping the hover position of the pointing device to a corresponding point on the user interface; detecting initiation of a movement of the pointing device toward the user interface; determining the hover position of the pointing device and the corresponding mapped point on the user interface at the detected initiation of the movement of the pointing device toward the user interface; setting the mapped point on the user interface at the detected initiation of movement as a selection point on the user interface; and registering a user input corresponding to the selection point in response to a detected contact of the pointing device with the user interface.

In another aspect, a computer program product may be embodied on a non-transitory computer readable medium. The computer readable medium may have stored thereon a sequence of instructions which, when executed by a processor causes the processor to execute a method. The method may include tracking a hover position of a pointing device within a detecting zone of a user interface; mapping the hover position of the pointing device to a corresponding point on the user interface; detecting initiation of a movement of the pointing device toward the user interface; determining the hover position of the pointing device and the corresponding mapped point on the user interface at the detected initiation of the movement of the pointing device toward the user interface; setting the mapped point on the user interface at the detected initiation of movement as a selection point on the user interface; and registering a user input corresponding to the selection point in response to a detected contact of the pointing device with the user interface.

The details of one or more implementations are set forth in the accompanying drawings and the description below. Other features will be apparent from the description and drawings, and from the claims.

DETAILED DESCRIPTION

Figure 1A:
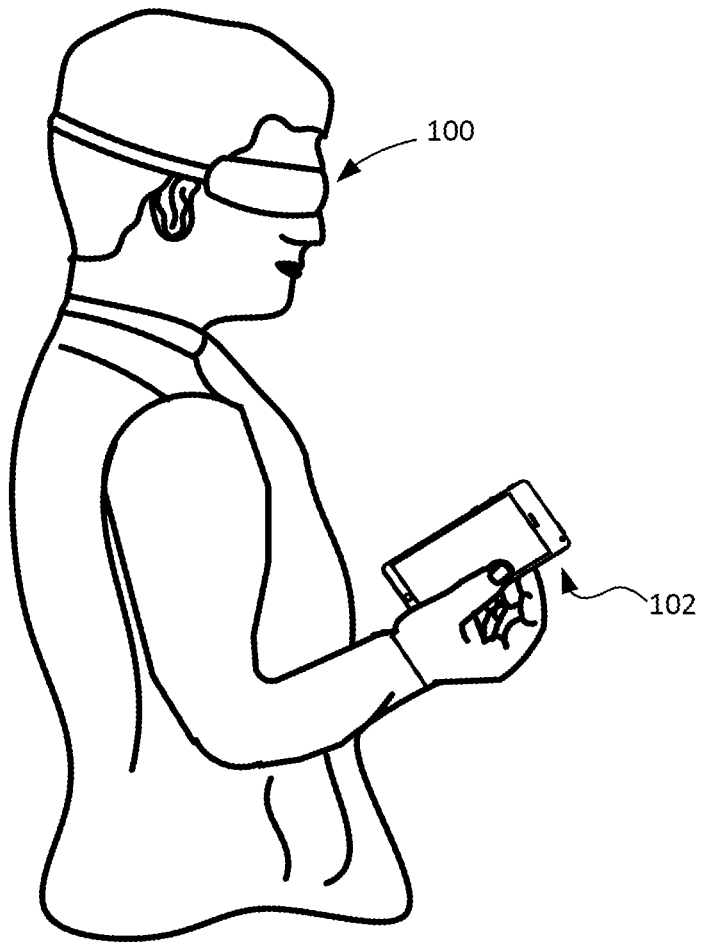
FIGS. 1A and 1B illustrate an example implementation of a virtual reality system including a head mounted display device and a handheld electronic device, in accordance with implementations as described herein.

A user immersed in an augmented and/or virtual reality environment wearing, for example, a head mounted display (HMD) device may explore the 3D virtual environment and interact with the 3D virtual environment through, for example, physical interaction (such as, for example, hand/arm gestures, head movement, walking and the like) and/or manipulation of the HMD and/or a separate electronic device to experience the virtual environment and to interact with virtual objects, features, elements and the like in the virtual environment. For example, in some implementations, the HMD may be paired with one or more handheld electronic devices, such as, for example, a controller, a gyromouse, or other such handheld electronic device. User manipulation of the handheld electronic device(s) paired with the HMD may allow the user to interact with the features in the virtual environment generated by the HMD. Similarly, the exchange of information between the HMD and the handheld electronic device by pairing in this manner may allow features of the handheld electronic device, that are not directly associated with the virtual environment being generated by the HMD and currently experienced by the user, such as, for example, a messaging application and the like, to be accessed by the user while immersed in the virtual environment, even when the handheld electronic device may not be directly visible to the user due to the construct of the HMD. In a system and method, in accordance with implementations as described herein, a user may manipulate the handheld electronic device paired with the HMD to cause a desired action in the virtual environment generated by the HMD, and/or to cause a desired action in an application associated with operation of the handheld electronic device.

In some situations, because the virtual environment is displayed to the user on a display of the HMD, and the user may not be able to see the handheld electronic device, it may be difficult for the user to accurate enter some types of inputs via the handheld electronic device. For example, it may be difficult for a user to input a text entry using a keyboard provided on the handheld electronic device without being able to see the handheld electronic device and/or a finger position relative to the keyboard on the handheld electronic device. Thus, in some implementations, a virtual interface screen may be rendered and displayed to the user in the virtual environment, mimicking a user interface, such as an entry screen, available on the handheld electronic device. In some implementations, an indicator of a finger position relative to the user interface, such as, for example, a keyboard, of the handheld electronic device may also be rendered in the virtual environment, to provide the user with a visual indication of finger position relative to the various elements of the user interface, and facilitate selection and entry through manual manipulation of the handheld electronic device.

When entering a touch input on a touch surface of a handheld electronic device, an actual point at which the user's finger makes contact with the touch surface may be somewhat offset from the user's intended contact point on the touch surface, even when the touch surface is directly visible to the user. This offset may be due to, for example, the physiology of the finger and the somewhat arcuate, or indirect, path the finger may follow as the finger moves from a hover position, above the touch surface, toward the touch surface. This offset effect may be exacerbated in a virtual environment, as the handheld electronic device, and the hand and/or finger approaching the touch surface of the handheld electronic device, may not be directly visible to the user due to the physical construction of the HMD. In some situations, this may be further complicated as the virtual user interface may not be positioned and/or oriented in the virtual environment to correspond to the physical position and/or orientation of the handheld electronic device and/or the user's hand/finger in the ambient environment.

In a hover touch compensation system, in accordance with implementations described herein, the system may determine an intended contact point on a touch surface of a handheld electronic device by tracking, substantially continuously, a position of a pointing device, or pointer, such as, for example, a user's finger, hovering over the touch surface, and identifying an intended contact point on the touch surface based on a hover position of the pointer at a point at which initiation of a movement of the pointer toward the touch surface is detected. Similar principles may be applied to the determination of an intended virtual contact point in a virtual user interface. For example, in some implementations, the system may determine an intended virtual contact point relative to a virtual interface displayed in a virtual environment by tracking, substantially continuously, a position of a designated selector, or designated pointer, such as, for example, a handheld electronic device, the user's hand, and the like, hovering with respect to the virtual user interface, and identifying an intended virtual contact point on the virtual user interface based on a hover position of the designated pointer at a point at which initiation of a movement of the designated pointer toward the virtual user interface is detected.

Figure 1B:
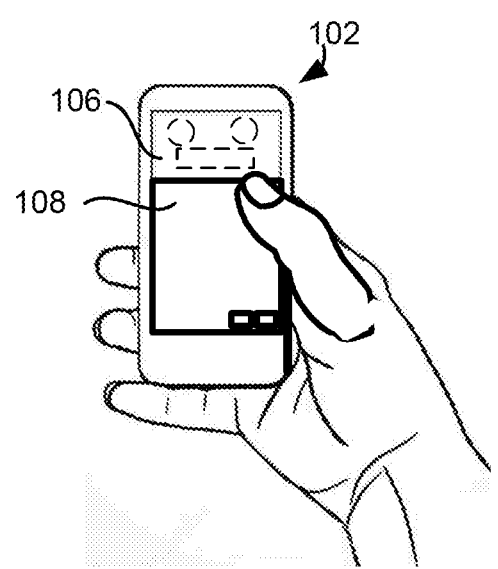

In the example implementation shown in FIGS. 1A and 1B, a user wearing an HMD 100 is holding a portable handheld electronic device 102, or controller 102, that may be operably coupled with, and communicate with, the HMD 100 via, for example, a wired connection, or a wireless connection such as, for example, a WiFi or Bluetooth connection. This may provide for communication between and the exchange of data between the handheld electronic device 102 and the HMD 100, so that a manipulation of the handheld electronic device 102, such as, for example, an input received on a touch surface 108 and or manipulation of another manipulation device 106 of the handheld electronic device 102, a movement of the handheld electronic device 102, and the like may be translated into a corresponding interaction in the virtual environment generated by the HMD 100. A single handheld electronic device 102, or controller 102, is included in the example implementation shown in FIGS. 1A and 1B, simply for ease of discussion and illustration. However, multiple different external electronic devices may be paired with the HMD 100, with the principles to be described herein applicable to the multiple different external electronic devices.

Figure 2A:
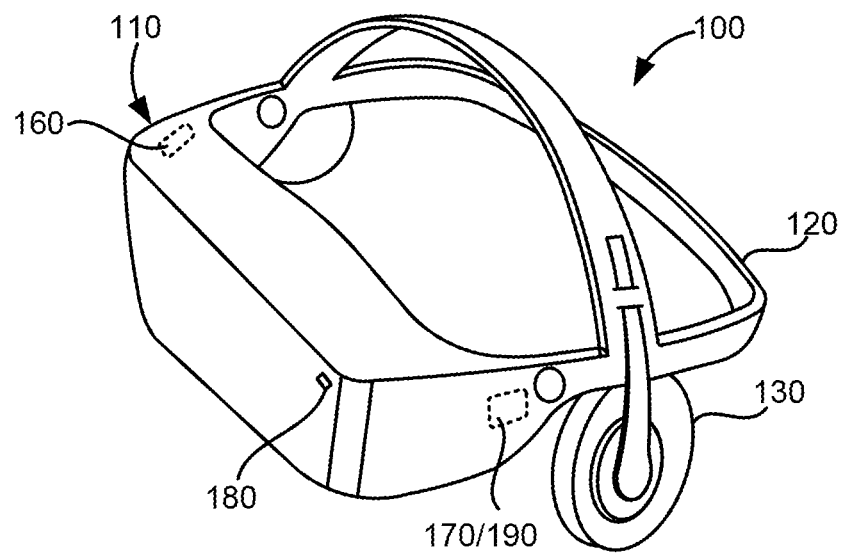
FIGS. 2A and 2B are perspective views of an example head mounted display device, in accordance with implementations as described herein.
Figure 2B:
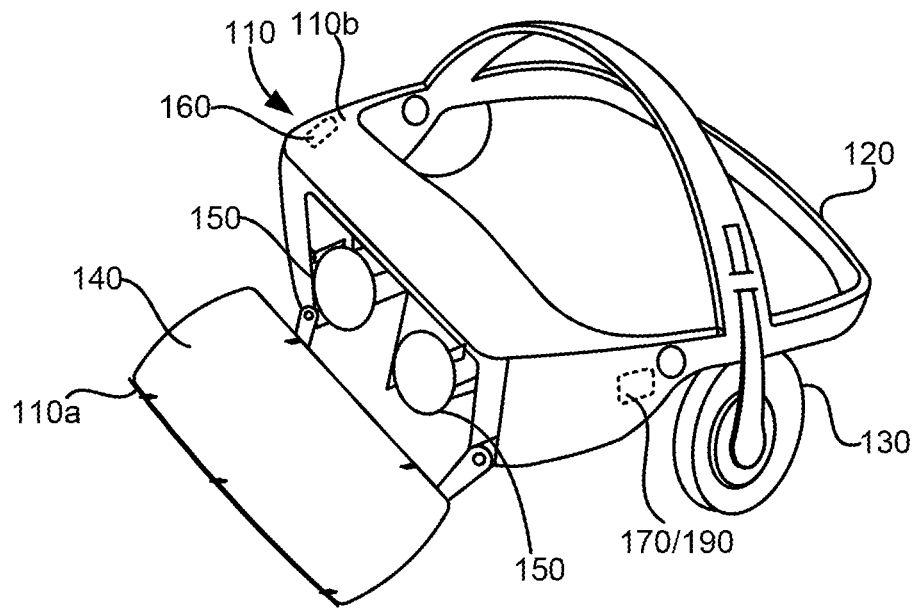

FIGS. 2A and 2B are perspective views of an example HMD, such as, for example, the HMD 100 worn by the user in FIG. 1A. The HMD 100 may include a housing 110 coupled to a frame 120, with an audio output device 130 including, for example, speakers mounted in headphones, also coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. The HMD 100 may include a sensing system 160 including various sensors and a control system 170 including a processor 190 and various control system devices to facilitate operation of the HMD 100. A camera 180 may capture still and/or moving images that may be used to help track a physical position of the user and/or the handheld electronic device 102. The captured images may also be displayed to the user on the display 140 in a pass through mode.

In some implementations, the HMD 100 may include a gaze tracking device 165 to detect and track an eye gaze of the user. The gaze tracking device 165 may include one or more sensors 165A to detect and track eye gaze direction and movement. For example, the gaze tracking device may include one or more light sensor(s) and/or one or more image sensor(s) 165A, and the like, capturing images of the user's eyes for processing as user input to be translated into a corresponding interaction in the virtual environment.

Figure 3:
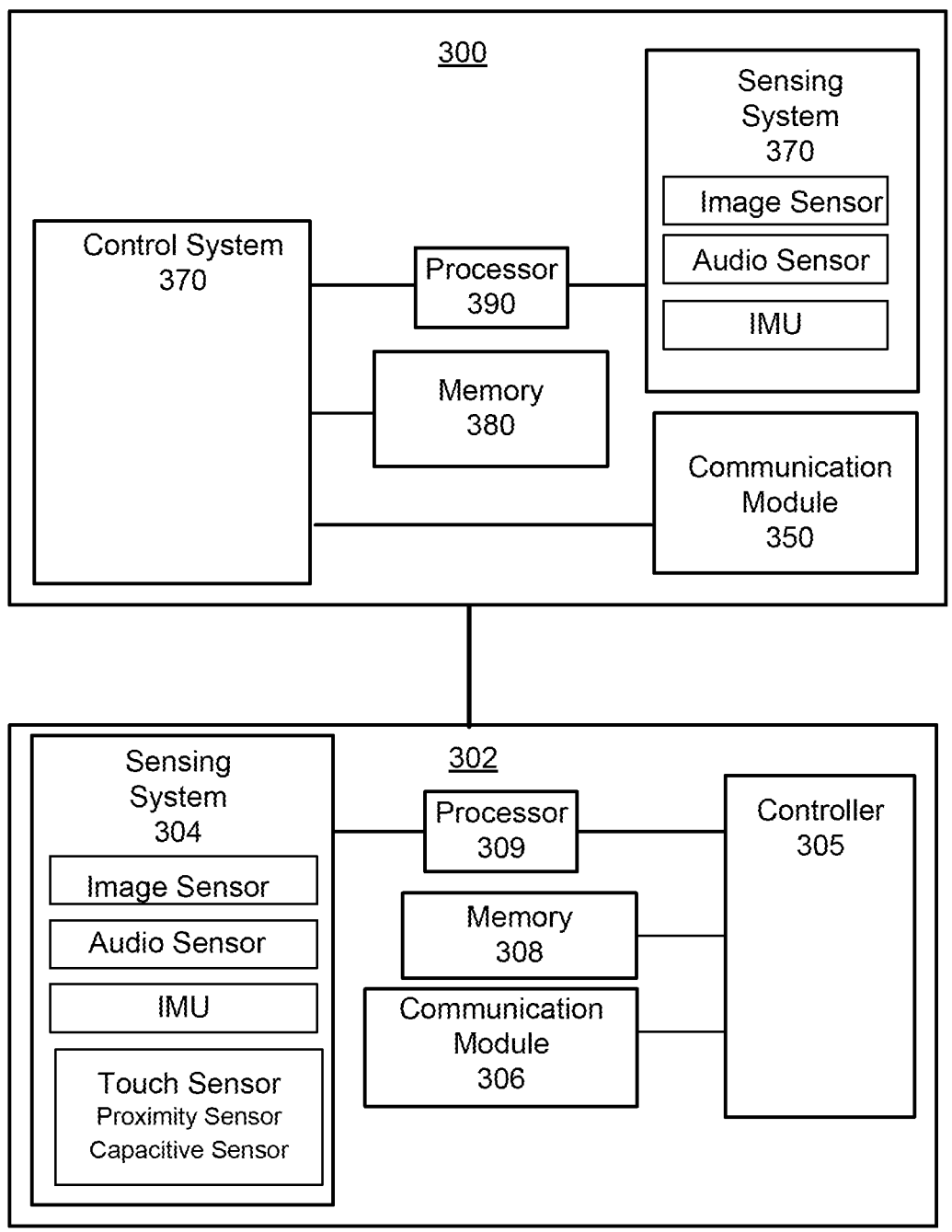
FIG. 3 is a block diagram of a first electronic device and a second electronic device of an augmented and/or virtual reality system, in accordance with implementations as described herein.

A block diagram of a system, in accordance with implementations described herein, is shown in FIG. 3. The system may include a first electronic device 300 (such as, for example, an HMD as described above with respect to FIGS. 1A-2B), and a second electronic device 302 (such as, for example, a controller as described above with respect to FIG. 1B) in communication with the first electronic device 300.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, a gaze tracking sensor, and/or other sensors and/or different combination(s) of sensors. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370. The first electronic device 300 may also include a memory 380, and a communication module 350 providing for communication between the first electronic device 300 and another, external device, such as, for example, the second electronic device 302. The processor 390 may also process inputs received from the second electronic device 302.

The second electronic device 302 may include a communication module 306 providing for communication and data exchange between the second electronic device 302 and another, external device, such as, for example, the first electronic device 300. The second electronic device 302 may include a sensing system 304 including, for example, an image sensor and an audio sensor, such as is included in, for example, a camera and microphone, an inertial measurement unit, a touch sensor such as is included in a touch sensitive surface of a handheld electronic device, including for example, a capacitive sensor that can detect proximity of a touching implement to the touch sensitive surface, a controller, a gyromouse, a smartphone and the like, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

Figure 4:
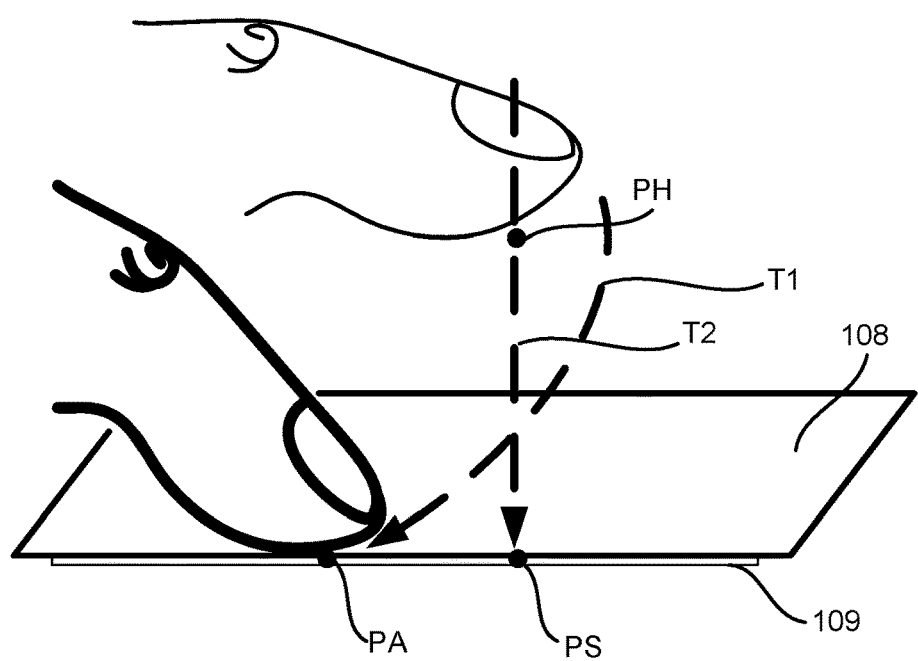
FIGS. 4 and 5 illustrate movement of a manual pointing/selecting device relative to a user interface of a handheld electronic device, in accordance with implementations as described herein.

As discussed above, when entering a touch input on a touch surface of the handheld electronic device 102, the user's finger may hover over the touch surface 108, at a hover point PH. The hover point PH may be substantially directly above an intended touch point PS on the touch surface 108 of the handheld electronic device 102, as shown in FIG. 4. For example, in some implementations, the intended touch point PS may be a projection of the hover touch point PH to the touch surface 108 of the handheld electronic device 102, for example, a normal, or orthogonal, projection of the hover touch point PH to the intended touch point PS on the touch surface 108 of the handheld electronic device 102. As the finger moves down, from the hover point PH toward the touch surface 108, to tap or touch the intended touch point PS, the motion of the finger may follow a somewhat arcuate, or indirect, path. As the finger follows this somewhat arcuate, or indirect, path, the actual touch point PA on the touch surface 108 may be somewhat offset from the intended touch point PS on the touch surface 108. As shown in FIG. 4, the touch or tap motion of the finger follows a somewhat arcuate path T1, rather than a direct, or straight, vertical path T2 to the touch surface 108. Thus, in the example shown in FIG. 4, without any type of hover compensation applied by the system, a touch or tap input at the actual touch point PA, rather than at the intended touch point PS, will be registered by the system. As noted above, this problem may be exacerbated when entering inputs on a user interface of the handheld electronic device 102 while the user is immersed in a virtual environment generated by the HMD 100. In this situation, the handheld electronic device 102, the user interface on the handheld electronic device 102, and the user's hand/finger, may not be visible to the user, and/or the virtual user interface may not be at the same virtual location and/or orientation in the virtual environment as the user's hand holding and manipulating the handheld electronic device 102 in the ambient environment.

Figure 5:
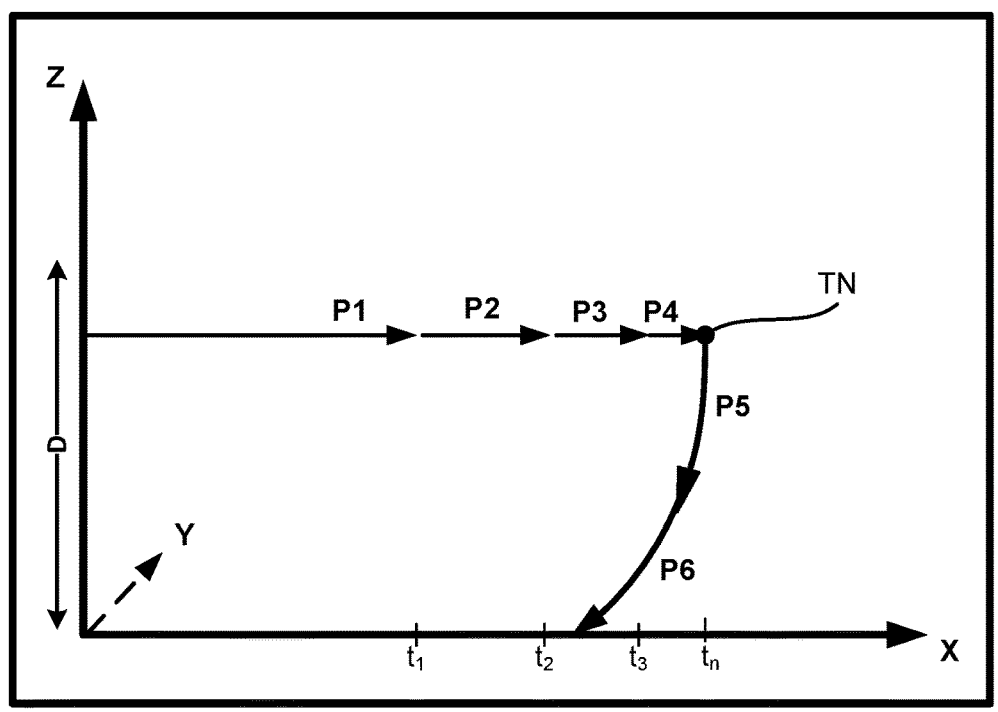

The hover position at the hover touch point PH of the user's finger relative to the touch surface 108 of the handheld electronic device 102, and the movement of the finger to the actual touch point PA discussed above with respect to FIG. 4, may be represented on an XYZ coordinate frame relative to the touch surface 108 of the handheld electronic device 102. As shown in FIG. 5, a position of the finger above the touch surface 108 of the handheld electronic device 102 may be detected, substantially continuously, and an (x, y, z) position of the finger as the finger hovers over the touch surface 108 of the handheld electronic device 102 may be recorded, substantially continuously, by the system. At each of a plurality of hover touch points, for example, hover touch points P1, P2, P3 and P4, a position of the finger is at a substantially constant vertical distance, represented by the Z axis, from the touch surface 108, over time, represented by the X axis. At a point TN, corresponding to a time tn, the system may detect initiation of a movement of the finger, for example, a downward movement of the finger, from the hover point P4 toward the touch surface 108, along the path T5. This may be detected by, for example, a sensor of the handheld electronic device 102, in the form of, for example, a change in a sensed proximity of the finger to the handheld electronic device 102, a change in acceleration of movement and the like.

As described above with respect to FIG. 4, upon detecting initiation of the downward movement of the user's finger at the point TN (corresponding, in this example, to the hover point P4), the system may determine that the hover point P4 corresponds to a particular intended touch point PS, as shown in FIG. 4, even if the path T5 followed by the finger in FIG. 5 results in an actual touch point PA on the touch surface 108 of the handheld electronic device 102, as shown in FIG. 4. As noted above, in some implementations, the intended touch point PS may be an essentially orthogonal, or normal projection of the hover touch point PH onto the touch surface 108 at the point at which the movement toward the touch surface 108 is detected. In some implementations, the hover touch points PH (i.e., P1, P2, P3, P4 shown in FIG. 5), as well as initiation of the movement of the finger from one of the hover touch points PH toward the touch surface 108, may be detected and tracked by, for example, a sensor of the handheld electronic device 102. For example, in some implementations, the handheld electronic device 102 may include a sensor such as, for example, a capacitive sensor 109, adjacent to the touch surface 108. The capacitive sensor 109 may detect the presence, proximity and movement of one or more electrically conductive and electrically grounded objects, such as, for example, the user's finger(s). The capacitive sensor 109 may include, for example, a single layer capacitive sensor or a multi-layer array of capacitors, so that capacitance changes in the area of the capacitive sensor 109 at which an electrically grounded object (such as the user's finger) is detected indicate the presence, or proximity, or touch by the electrically grounded object.

The capacitive sensor 109, in conjunction with the controller of the handheld electronic device 102, may detect and track the position(s) of the user's finger(s), for example, within a detection range or zone D, relative to the touch surface 108 of the handheld electronic device 102, to within the defined detection range or zone D, for example, in the Z direction as described above with respect to FIG. 5. In particular, the capacitive sensor 109 and controller may detect and track the position of the user's finger as it corresponds to a point on the touch surface 108 (that point corresponding, for example, to an object available for selection at a corresponding position of a user interface on the touch surface 108). The capacitive sensor 109 may also detect a change in the distance between the user's finger and the capacitive sensor 109 (and between the user's finger and the touch surface 108) to detect the initiation of the movement of the user's finger from the hover touch position PH toward the touch surface 108. The detected initiation point of the movement from the hover touch position PH toward the touch surface 108 may provide an indication of the user's intended touch point PS on the touch surface 108, as described above.

In some implementations, the capacitive sensor 109 may detect the proximity of the electrically grounded pointing implement (for example, the user's finger(s)) to within a defined proximity, or detection range, or detection zone D of the capacitive sensor 109 adjacent to the touch surface 108 of the handheld electronic device 102. For example, in some implementations, a detection range, or zone, of the capacitive sensor in the Z direction may be as high as 10 to 15 cm.

In some implementations, the hover touch point PH (i.e., P1, P2, P3, P4 shown in FIG. 5), as well as initiation of the movement of the finger from the hover touch point PH toward the touch surface 108, may be detected by, for example, a sensor of the HMD 100, or another sensor included in the system. For example, in some implementations, an image sensor, such as, for example, a camera of the HMD 100, may capture images of the user's finger(s) relative to the touch surface 108 of the handheld electronic device 102. These images, combined with a known position and orientation of the handheld electronic device 102 relative to the HMD 100, may be processed, for example, by the HMD 100 to determine the hover touch point PH of the user's finger relative to the touch surface 102, as well as the point at which movement from the hover touch point PH toward the touch surface 108 is initiated, to in turn determine the intended touch point PS as described above.

As noted above, the system may track the position of the user's finger with respect to the touch surface 108, substantially continuously, as described above. In some implementations, the system may determine the intended touch point PS based on the hover touch point PH of the user's finger detected at a set interval of time before the touch at the actual touch point PA on the touch surface 108 is detected. That is, in some implementations, upon detecting a touch on the touch surface 108 at the actual touch point PA, the system may determine that the intended touch point PS corresponds to a hover touch point PH detected within a set interval of time. In some implementations, the set interval of time may be a relatively short interval of time, such as, for example, less than 1 to 2 seconds.

In the example implementations described above, the intended touch point PS is determined to be a projection, for example, an essentially orthogonal projection, of the hover touch point PH of the user's finger at the point at which movement of the user's finger toward the touch surface 108 is detected. In some implementations, the intended touch point PS may be determined to be a point that is offset, for example, between the actual touch point PA and the orthogonal projection of the hover touch point PH at the point at which the downward movement of the user's finger is detected. This determination of the intended touch point PS, based on the tracked hover positions PH of the users finger and the detection of movement of the user's finger toward the touch surface 108, may be adjusted based on, for example, a particular application being executed, particular elements, spacing and the like of the user interface, speed of movement of the user's finger and/or distance of the user's finger from the touch surface, and other such factors.

In the example discussed above, the sensing system of the handheld electronic device 102, for example, the capacitive sensor 109 together with the controller, may detect and track an (x, y, z) fingertip position for a region adjacent to and extending outward from the touch surface 108 of the handheld electronic device 102, or over the touch surface 108 of the handheld electronic device 102. The detected (x, y, z) fingertip position in this hover region may be, for example, mapped to a corresponding virtual user interface in the virtual environment displayed to the user by the HMD 100, for example, on the display 140 of the HMD 100. Based on this mapping, user inputs and/or selections may be recorded as the movement of the user's fingertip from the hover position toward the touch surface 108 is detected in the manner described above.

Figure 6A:
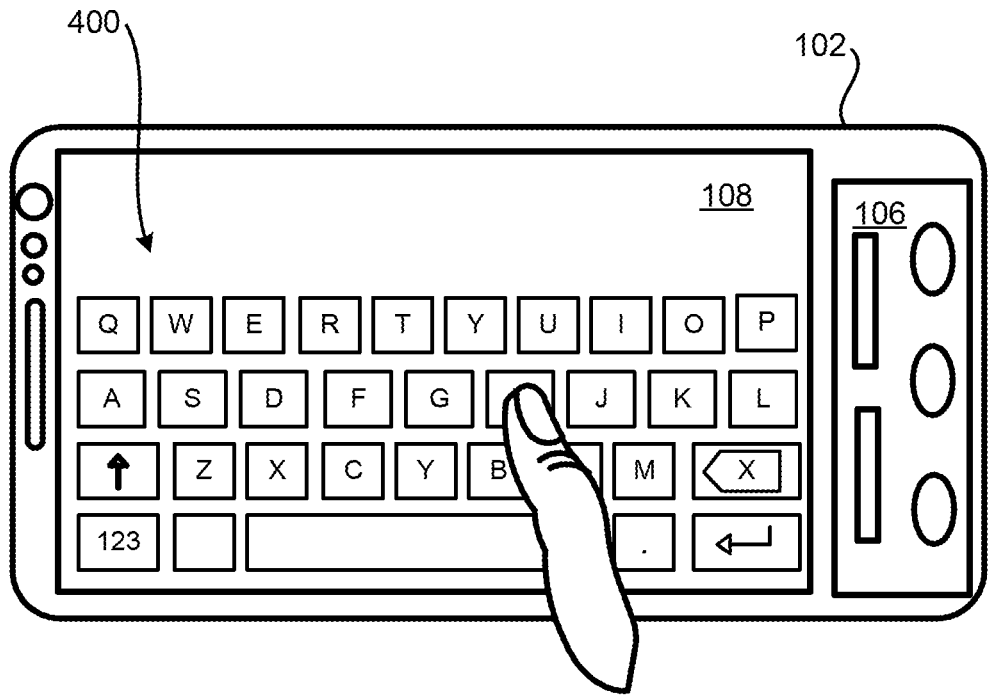
FIGS. 6A-6F illustrate detection and tracking of a position of a manual pointing/selecting device relative to a user interface of a handheld electronic device, and corresponding mapping to a virtual user interface in an augmented and/or virtual reality system, in accordance with implementations as described herein.
Figure 6B:
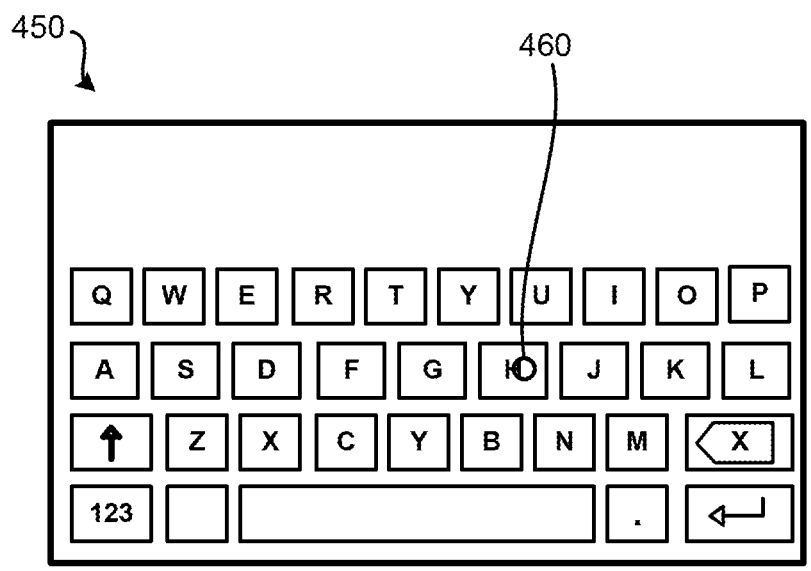

In some implementations, a user interface 400 may be provided on the handheld electronic device 102, such as, for example, on the touch surface 108 of the handheld electronic device 102, to receive user input, as shown in FIG. 6A. In some implementations, the user interface 400 may simply be defined as a region of the touch surface 108 capable of receiving user touch inputs which may correspond to actions to be executed by the handheld electronic device 102 and/or transmitted to the HMD 100 for execution in the virtual environment. In some implementations, the user interface 400 may include elements, objects, features and the like that are selectable by the user in response to a touch input. As the touch surface 108 and/or the user interface 400 on the handheld electronic device 102 may not be directly visible to the user while wearing the HMD 100 and immersed in the virtual environment, the system may generate a virtual representation of the user interface 400, and display the virtual representation as a virtual user interface 450 to the user, for example, on the display 140 of the HMD 100, as shown in FIG. 6B. That is, FIG. 6B (as well as FIGS. 6D and 6F) illustrates the virtual user interface 450, as viewed by the user wearing the HMD 100. The example user interface 400 shown in FIG. 6A, and the corresponding virtual representation of the user interface 400, i.e., the example virtual user interface 450 shown in FIG. 6B, are illustrated as keyboards, simply for ease of discussion and illustration. The principles discussed herein may be applied to other types of user interfaces, such as, for example, icons, menus, lists and the like, which may be presented to the user for selection, manipulation, interaction and the like in response to a user touch input.

As illustrated in the example shown in FIG. 6A, the user's finger may hover over a particular item/object/feature/element available for selection on the physical user interface 400 provided on the handheld electronic device 102, such as the letter H in this example. As shown in FIG. 6B, the virtual user interface 450 may be rendered and displayed to the user as a virtual object in the virtual environment, with user inputs detected at the physical user interface being mapped to and displayed to the user on the virtual user interface 450. As the user's finger hovers over the letter H of the physical user interface 400, a virtual indicator 460 may be displayed on the virtual user interface 450 displayed to the user in the virtual environment, as shown in FIG. 6B, providing a visual indication to the user of the hover position detected relative to the physical user interface 400 on the touch surface 108 shown in FIG. 6A. The virtual indicator 460 may be, for example, a virtual dot overlaid on a corresponding portion of the virtual user interface 450, a change in appearance of a corresponding portion of the virtual user interface, or other visual marker indicating to the user a finger position relative to the physical user interface 400/virtual user interface 450.

As the user's finger moves from the hover position above the letter H on the user interface 450 (i.e., the hover touch point PH as discussed above with respect to FIG. 4) towards the touch surface 108 of the handheld electronic device 102 to make contact with the touch surface 108 and select the letter H (i.e., the intended touch point PS as discussed above with respect to FIG. 4), the user's finger follows a somewhat arcuate path, and may contact a portion of the user interface 400 on the touch surface 108 not necessarily corresponding to the letter H (i.e., the actual touch point PA as discussed above with respect to FIG. 4). In a system and method, in accordance with implementations described herein, the system (for example, the capacitive sensor 109, together with the controller, of the handheld electronic device 102) may detect and track the hover touch position PH of the user's finger as the user's finger moves relative to the touch surface 108 and the adjacent capacitive sensor 109, mapping the detected hover touch position PH to a corresponding portion (such as, for example, a selectable item) of the user interface 400. The system may also generate and display the virtual indicator 460 on the virtual user interface 450 as described above, mapping the detected hover touch position PH of the user's finger to a corresponding position on the virtual user interface 450, to provide the user with a visual indication of a position of the user's finger relative to the physical user interface 400 and the virtual user interface 450, to facilitate user interaction in the virtual environment using the interfaces 400/450.

Figure 6C:
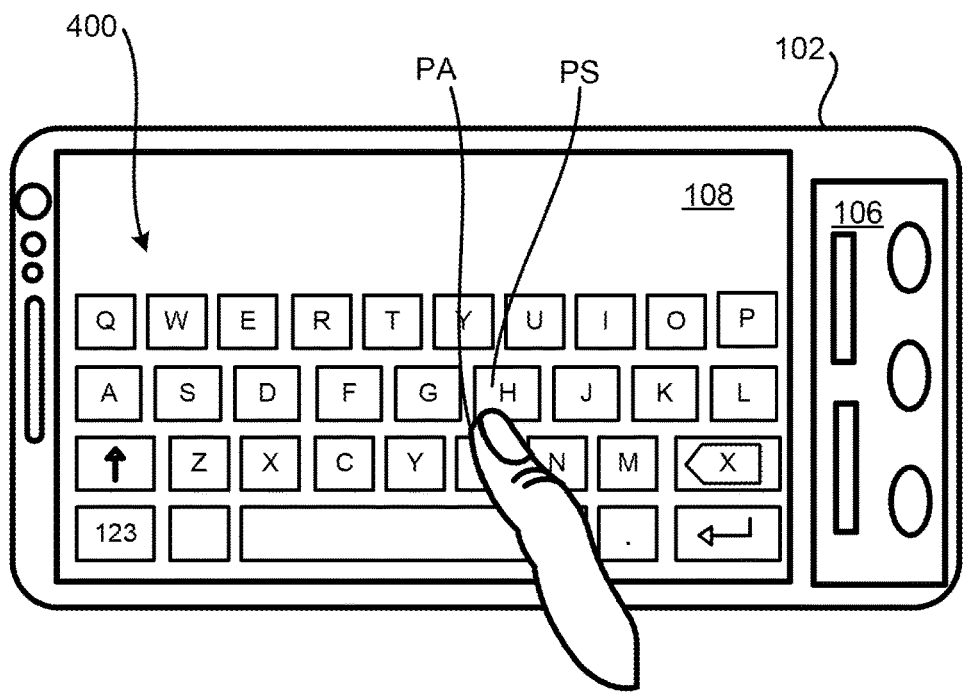

The system (for example, the capacitive sensor 109, together with the controller, of the handheld electronic device 102) may detect movement of the user's finger from the detected hover touch point PH (for example, above the letter H as shown in FIG. 6A) toward the touch surface 108 of the handheld electronic device 102. In response to detection of this movement toward the touch surface 108, the system may determine that, at the point of detected movement toward the touch surface 108, the user's finger was positioned at a hover touch point PH corresponding to the letter H. Based on this, the system may determine that it is the user's intention to select the letter H, even though, due to the somewhat arcuate path of the user's finger from the hover touch point PH to the actual touch point PA on the touch surface 108, the actual touch point PA is offset from the intended touch point PS, as shown in FIGS. 4 and 6C. In response to this determination, the system may register, or execute, a user input, or selection, at the intended touch point PS (the letter H in this example), as shown in FIG. 6D, rather than at the actual touch point PA, as shown in FIG. 6C.

Figure 6D:
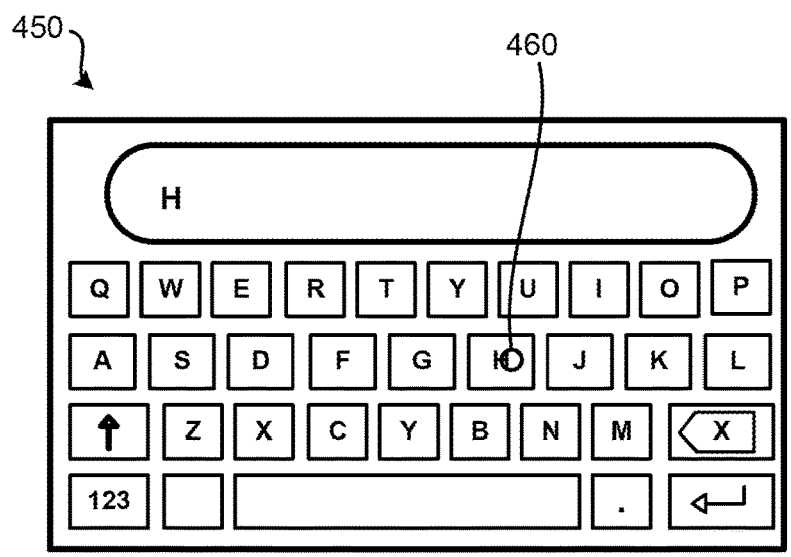
Figure 6E:
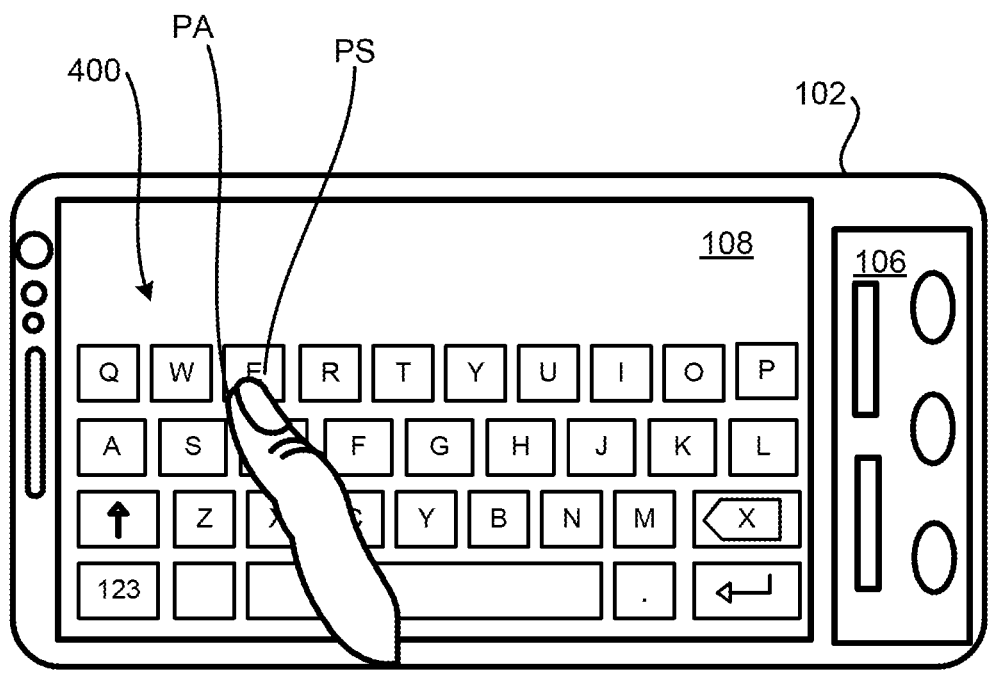
Figure 6F:
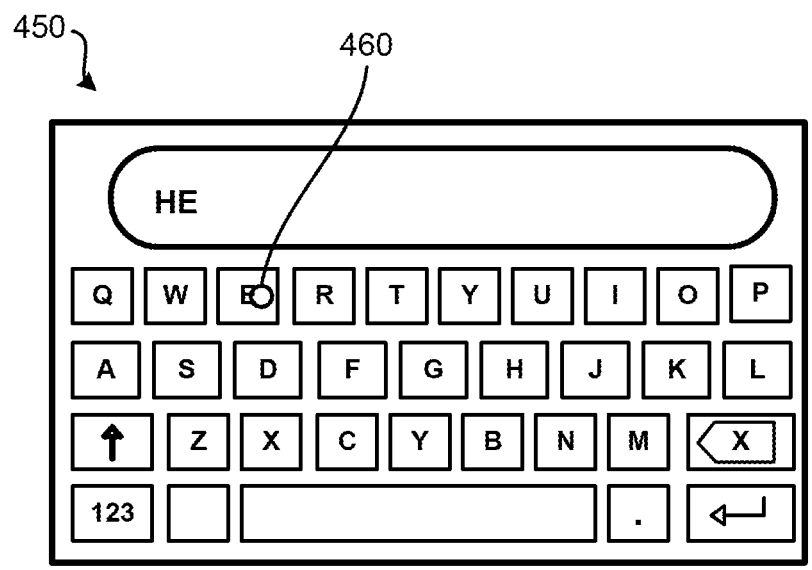

After the user's input is registered, or executed, as shown in FIGS. 6C-6D, the user may move the finger to select a subsequent item. For example, as shown in FIGS. 6E-6F, the user may move the finger to hover over the next item on the user interface 400/450 intended for selection (in this example, the letter E on the user interface 400/450). The detected hover touch point PH of the finger above the letter E on the user interface 400 may be mapped to and marked by the visual indicator 460 on the virtual user interface 450. Upon detection of movement of the finger from the hover touch point PH over the letter E toward the touch surface 108 of the handheld electronic device 102, the system may determine that the letter E is the intended touch point PS, even though the actual touch point PA may be somewhat offset from the intended touch point PS, and may register, or execute, the letter E as the intended user input. This process may continue until a user has completed a particular input and/or series of inputs.

Figure 7A:
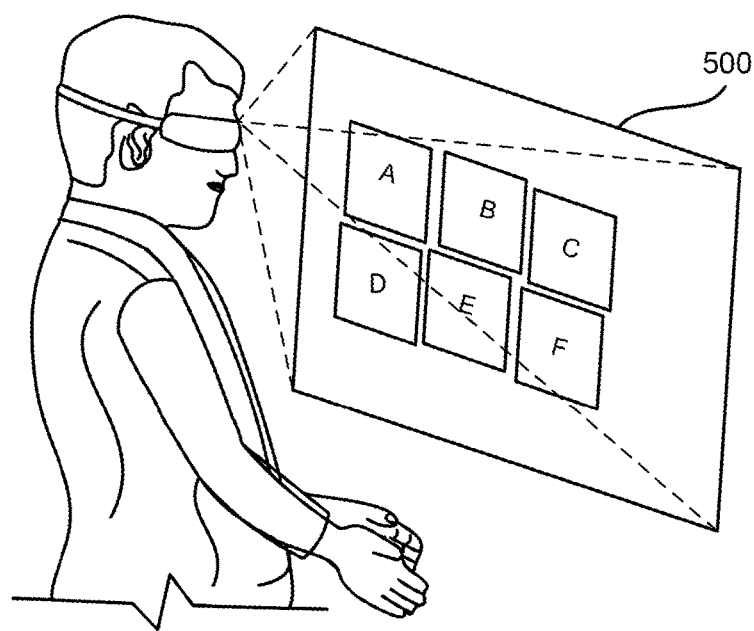
FIGS. 7A-7C illustrate detection and tracking of a position of a pointing/selecting device relative to a virtual user interface in an augmented and/or virtual reality system, in accordance with implementations as described herein.

In some implementations, a user may interact with virtual user interfaces, objects, items, elements and the like displayed to the user in the virtual environment generated by the HMD 100 using physical gestures, with or without the use of other external electronic devices such as, for example, the handheld electronic device 102 and/or other sensors worn on the hand or arm that may be detected and tracked by the system. FIG. 7A is a third person view of the user, wearing the HMD 100, and illustrates a virtual user interface 500 generated by the HMD 100 as viewed by the user.

As shown in FIG. 7A, in some implementations, the virtual user interface 500 may include a plurality of virtual features A, B, C, D, E and F displayed to the user, for example, within what may be considered to be a typical arms reach of the user. This may allow the user to interact with the virtual features A-F provided in the virtual user interface 500 through, for example, reaching and/or grabbing and/or touching motions. In this example implementation, the system may detect and track a position of the user's hand(s) to detect selection of one of the virtual features A-F, and/or the system may detect and track a position of the handheld electronic device 102 held in the user's hand as the user interacts with the virtual features A-F of the virtual user interface 500, and/or the system may detect and track one or more sensors fitted on the hand of the user as the user interacts with the virtual features A-F of the virtual user interface 500, and the like. In the example shown in FIGS. 7A-7C, the user interacts with virtual features displayed in the virtual environment using hand/arm gestures, simply for ease of discussion and illustration. However, the principles to be described may be applied to user interaction with virtual objects, features and the like in the virtual environment using a variety of different designated selection devices whose position and/or orientation may be detected and tracked by the system.

Figure 7C:
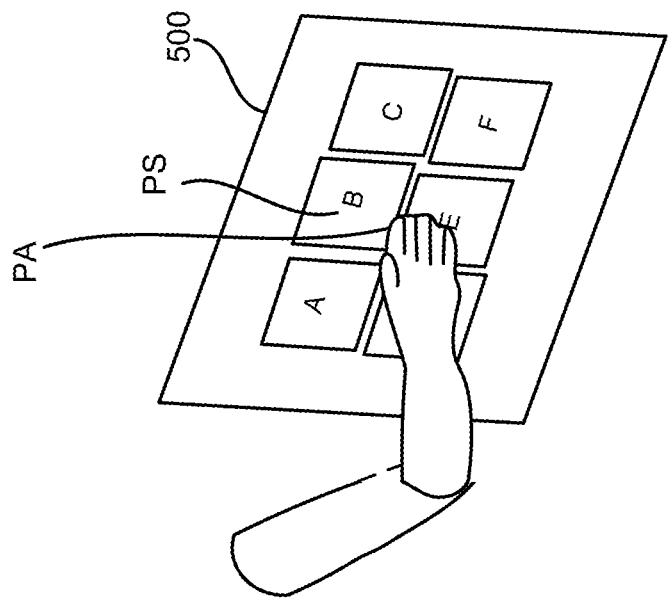
Figure 7B:
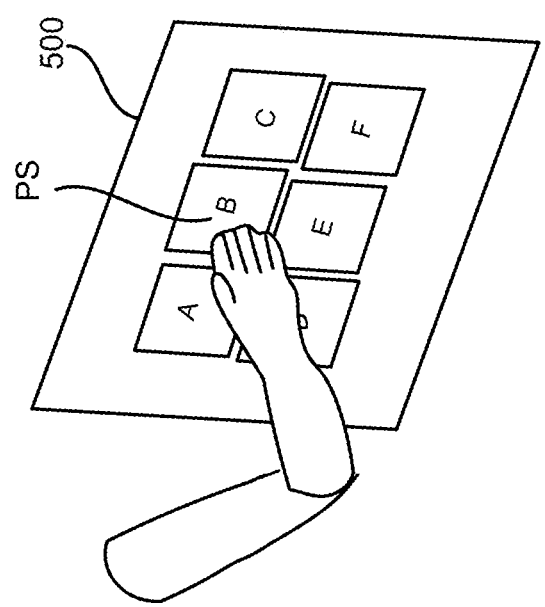

The interaction of the user's hand/arm (or other designated selection device) with the virtual features A-F of the virtual user interface 500 may be similar to the interaction of the user's finger(s) with the user interface 400 on the touch surface 108 of the handheld electronic device 102 described above with respect to FIGS. 4-5. That is, the user's hand may hover at a position corresponding to a particular one of the virtual features A-F of the virtual user interface 500, such as, for example, the virtual feature B, as shown in FIG. 7B. Movement of the user's hand, at the end of the user's arm, may follow a somewhat arcuate, or indirect, path, as the hand moves from a hover position with respect to the virtual user interface 500 (in particular, with respect to the virtual feature B) towards the virtual user interface 500, with the intention of making virtual contact with the virtual feature B, resulting in an offset between the intended touch point PS (in this example, the virtual feature B) and the actual touch point PA, as shown in FIG. 7C. (This may be similar to the movement of the user's finger relative to the user interface 400 on the touch surface 108 of the handheld electronic device 102 described above in detail with respect to FIGS. 4-6, in that the movement follows a somewhat arcuate, or indirect path, from the hover touch point PH to the actual touch point, resulting in an offset between the intended touch point PS and the actual touch point PA.)

The system may detect and track the position of the user's hand with respect to the virtual user interface 500, and may detect initiation of movement of the user's hand from a hover touch point PH toward the virtual user interface 500, mapping the detected hover touch point PH of the hand to a corresponding portion of the virtual user interface 500 (for example, mapping the detected hover touch point PH to the virtual feature B in FIG. 7B). The system may determine the intended user input/selection based on the hover touch point PH at the point at which initiation of the movement toward the virtual user interface 500 is detected, and may register the user selection at the intended touch point PS, rather than at the actual touch point PA.

In a hover touch compensation system and method, in accordance with implementations described herein, the system may determine an intended contact point on a user interface, provided on, for example, a touch surface of a handheld electronic device and/or a virtual display of a virtual user interface, by tracking, substantially continuously, a position of a pointing/selecting input device, such as a user's finger or hand hovering with respect to the user interface, and identifying an intended contact point on the user interface at a point at which initiation of a movement of the pointing/selecting implement from the hover point toward the user interface is detected. This may facilitate user interaction with a handheld electronic device and/or controller in a virtual environment, as well as user interaction directly with virtual user interfaces in the virtual environment, and may improve user input accuracy.

Figure 8:
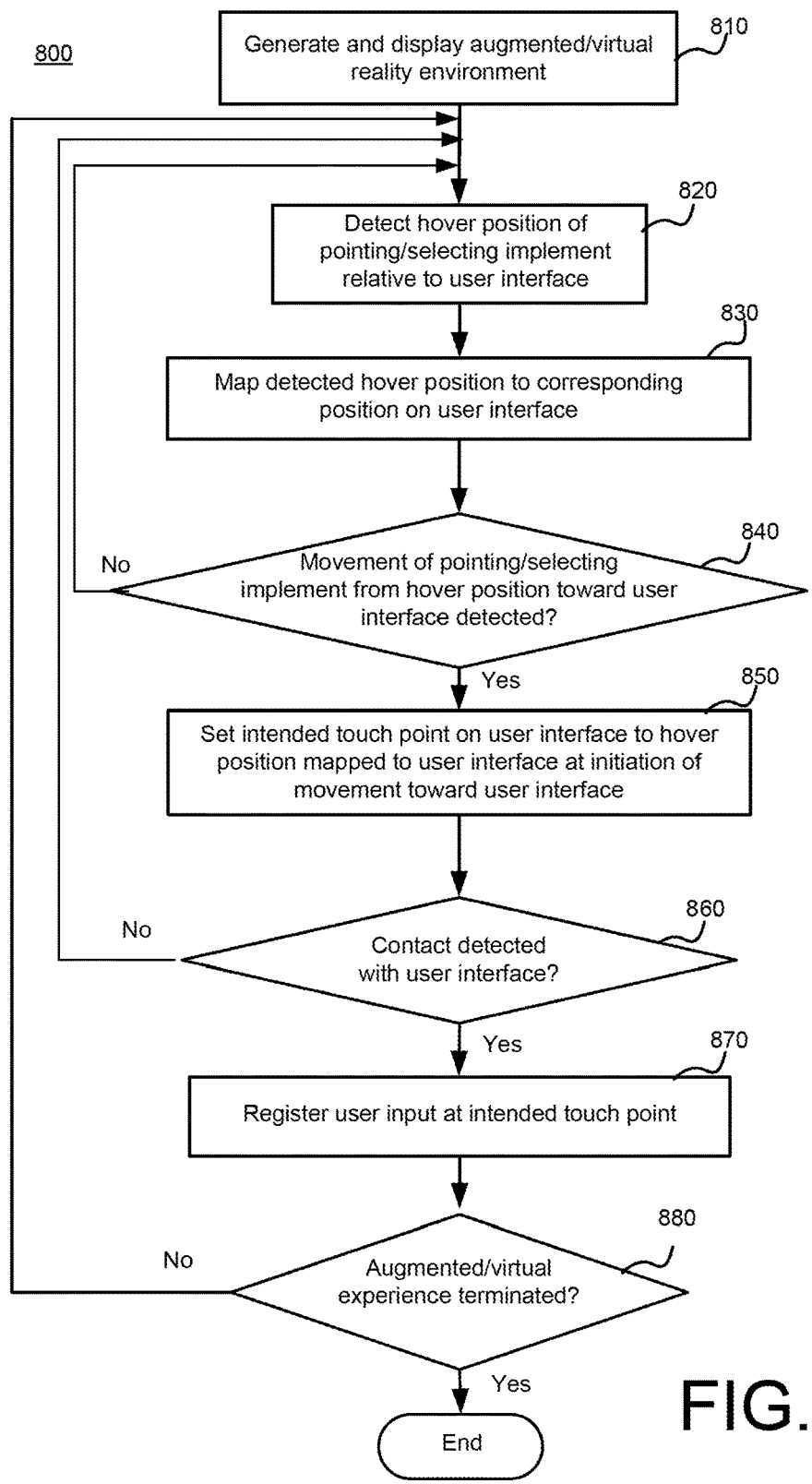
FIG. 8 is a flowchart of a method of detecting and tracking a position of a manual pointing/selecting device relative to a user interface of a handheld electronic device, and corresponding mapping to a virtual user interface in an augmented and/or virtual reality system, in accordance with implementations as described herein.

A method 800 of detecting and tracking a hover position of a user's hand(s) and/or finger(s) relative to user interface in an augmented and/or virtual reality system, in accordance with implementations described herein, is shown in FIG. 8. As noted above, the principles described may be applied to, for example, touch inputs received at a user interface of a handheld electronic device and mapped to a virtual user interface displayed in the virtual environment, as described above with respect to FIGS. 6A-6F, and also to, for example, inputs received through direct user interaction with a virtual user interface in the virtual environment, as described above with respect to FIGS. 7A-7C.

An immersive augmented and/or virtual reality experience may be generated and displayed to the user, for example, on a display of the HMD worn by the user (block 810). The system may then detect and track a hover position of a pointing/selecting device relative to a user interface (block 820), and map the detected hover position to a corresponding portion of the user interface (block 830). This may include, for example, detecting and tracking a finger hover touch point PH relative to the physical user interface 400 on the handheld electronic device 102, and mapping this detected finger hover touch point PH to a corresponding element on the user interface 400 of the handheld electronic device 102, and also to the virtual user interface 450 displayed in the virtual environment, as described above with respect to FIGS. 4-6F. This may also include detecting and tracking a hand hover position relative to a virtual user interface 500 displayed to the user in the virtual environment, and mapping this detected hand hover position to a corresponding virtual element of the virtual user interface 500, as described above with respect to FIGS. 7A-7C.

Upon detection of a movement of the pointing/selecting implement from the hover position toward the user interface (block 840), the system may set an intended touch point based on the hover position that was mapped to the user interface at the point at which the initiation of movement was detected (block 850). This may include, for example, detecting initiation of movement of the user's finger from the hover touch point PH toward the user interface 400 at the point TN, and setting the intended touch point at the point PS on the user interfaces 400/450 corresponding to the hover touch position PH at the point TN, as described above with respect to FIGS. 4-6F. This may also include detecting initiation of movement of the user's hand the hover touch position toward the virtual user interface 500 at the point TN, and setting the intended touch point at the point PS on the virtual user interface 500 corresponding to the hover touch position PH at the point TN, as described above with respect to FIGS. 7A-7C.

The system may then register, or execute, a user input at the intended touch point upon detecting a user contact with the user interface (blocks 860, 870). This may include, for example, detecting a touch at the actual touch point PA on the user interface 400, and registering the input at the intended touch point PS, and mapping the input at the intended touch point PS to the virtual user interface 450, as described above with respect to FIGS. 4-6F. This may also include detecting a virtual contact between the user's hand and the virtual user interface 500 at an actual touch point PA, and registering the input at the intended touch point PS at the virtual user interface 500, as described above with respect to FIGS. 7A-7C.

This process may continue until the augmented/virtual reality experience is terminated (block 880).

Figure 9:
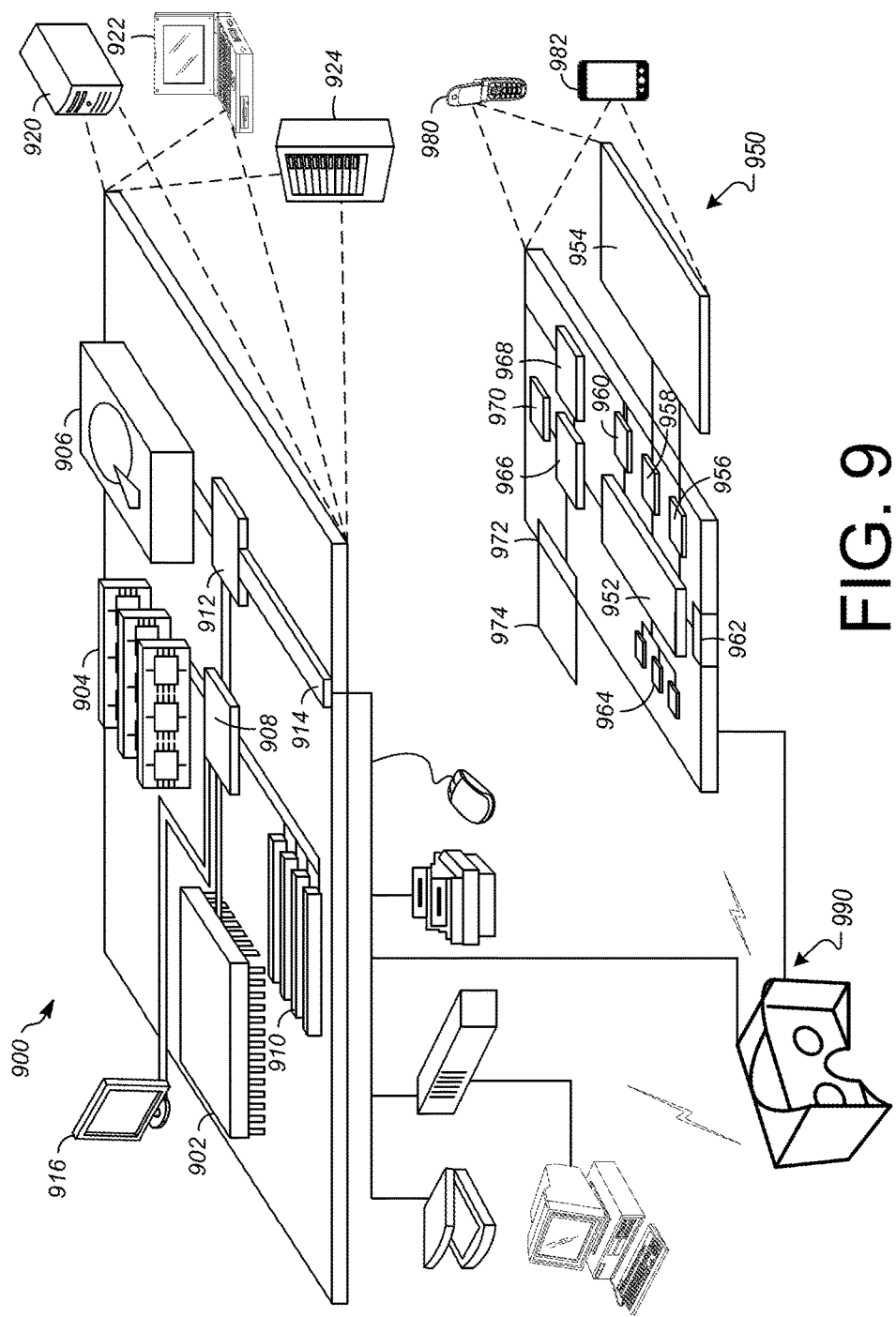
FIG. 9 shows an example of a computer device and a mobile computer device that can be used to implement the techniques described herein.

FIG. 9 shows an example of a computer device 900 and a mobile computer device 950, which may be used with the techniques described here. Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with a virtual reality (VR headset/HMD device 990). For example, one or more sensors included on a computing device 950 or other computing device depicted in FIG. 9, can provide input to VR headset 990 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 950 can use the sensors to determine an absolute position and/or a detected rotation of the computing device in the VR space that can then be used as input to the VR space. For example, the computing device 950 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 950 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the VR space can cause a particular action to occur in the VR space.

In some implementations, a touchscreen of the computing device 950 can be rendered as a touchpad in VR space. A user can interact with the touchscreen of the computing device 950. The interactions are rendered, in VR headset 990 for example, as movements on the rendered touchpad in the VR space. The rendered movements can control virtual objects in the VR space.

In some implementations, one or more output devices included on the computing device 950 can provide output and/or feedback to a user of the VR headset 990 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the VR space. In the example of the laser pointer in a VR space, the computing device 950 appears as a virtual laser pointer in the computer-generated, 3D environment. As the user manipulates the computing device 950, the user in the VR space sees movement of the laser pointer. The user receives feedback from interactions with the computing device 950 in the VR environment on the computing device 950 or on the VR headset 990.

In some implementations, a computing device 950 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 900 is intended to represent various forms of digital computers and devices, including, but not limited to laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
   tracking a hover position of a pointer within a detecting zone with respect to a user interface on a touch surface of a handheld electronic device;
   mapping the hover position of the pointer to a corresponding point on the user interface;
   determining initiation of a movement of the pointer toward the user interface on the touch surface of the handheld electronic device;
   determining the hover position of the pointer and the corresponding mapped point on the user interface at the determined initiation of the movement of the pointer toward the user interface on the touch surface of the handheld electronic device;
   setting the mapped point on the user interface at the determined point of initiation of movement of the pointer as a selection point on the user interface;
   detecting contact between the pointer and the user interface on the touch surface of the handheld electronic device at an actual contact point on the touch surface, the actual contact point being different from the selection point on the user interface; and
   registering a user input corresponding to the selection point in response to the detected contact of the pointer at the actual contact point on the user interface.

2. The method of claim 1, tracking the hover position of the pointer within the detecting zone with respect to the user interface including detecting and tracking a hover position of a finger within the detecting zone with respect to the user interface on the handheld electronic device, the handheld electronic device is operably coupled to a head mounted display device displaying virtual objects.

3. The method of claim 2, mapping the hover position of the pointer to the corresponding point on the user interface including:
   generating and displaying a virtual user interface corresponding to the user interface on the handheld electronic device;
   mapping the detected hover position of the finger to a corresponding point on the user interface of the handheld electronic device; and
   mapping the detected hover position of the finger and corresponding point on the user interface of the handheld electronic device to a corresponding virtual point on the virtual user interface.

4. The method of claim 3, further comprising displaying a virtual visual indicator visually marking the mapped corresponding virtual point on the virtual user interface.

5. The method of claim 3, setting the mapped point on the user interface at the determined initiation of movement of the pointer as the selection point on the user interface of the handheld electronic device including:
   detecting a movement of the finger from the hover position toward the user interface on the handheld electronic device;
   setting the mapped point on the user interface of the handheld electronic device at the determined initiation of movement of the pointer toward the user interface as the selection point on the user interface of the handheld electronic device; and
   mapping the selection point on the user interface of the handheld electronic device to a corresponding virtual selection point on the virtual user interface.

6. The method of claim 1, registering the user input corresponding to the selection point in response to the detected contact of the pointer with the user interface including:
    storing the tracked hover positions of the pointer;
    determining the hover position of the pointer at a set interval of time before detecting the contact of the pointer with the user interface based on the stored tracked hover positions of the pointer, and designating the determined hover position and a corresponding mapped point on the user interface as the selection point on the user interface; and
    registering the user input corresponding to the selection point in response to the detected contact of the pointer at the actual contact point with the user interface, the actual contact point being different from the selection point on the user interface.

7. The method of claim 1, tracking the hover position of the pointer within the detecting zone with respect to the user interface including detecting and tracking a hover position of a hand within a detection zone of a virtual user interface displayed by a head mounted display device, the head mounted display device also displaying a virtual environment.

8. The method of claim 7, registering the user input corresponding to the selection point in response to the detected contact of the pointer with the user interface including:
    detecting a virtual contact between the hand and a virtual contact point on the virtual user interface, the virtual contact point being different from a virtual selection point on the virtual user interface; and
    registering the user input corresponding to the virtual selection point on the user interface in response to the detected virtual contact at the virtual contact point, the virtual selection point corresponding to a hover position of the hand with respect to the virtual user interface at which a movement of the hand toward the virtual user interface is detected.

9. A non-transitory computer program product embodied on a non-transitory computer readable medium, the non-transitory computer readable medium having stored thereon a sequence of instructions which, when executed by a processor causes the processor to execute a method, the method comprising:
    tracking a hover position of a pointer within a detecting zone with respect to a user interface on a touch surface of a handheld electronic device;
    mapping the hover position of the pointer to a corresponding point on the user interface;
    determining an initiation of a movement of the pointing device toward the user interface on the touch surface of the handheld electronic device;
    determining the hover position of the pointer and the corresponding mapped point on the user interface at the determined initiation of the movement of the pointer toward the user interface on the touch surface of the handheld electronic device;
    setting the mapped point on the user interface at the determined initiation of movement as a selection point on the user interface;
    detecting contact between the pointer and the user interface on the touch surface of the handheld electronic device at an actual contact point on the touch surface, the actual contact point being different from the selection point on the user interface; and
    registering a user input corresponding to the selection point in response to the detected contact of the pointer with the user interface.

10. The non-transitory computer program product of claim 9, tracking the hover position of the pointer within the detecting zone with respect to the user interface includes detecting and tracking a hover position of a finger within a detecting zone with respect to a user interface provided on the handheld electronic device, the handheld electronic device being operably coupled to a head mounted display device displaying a virtual environment.

11. The non-transitory computer program product of claim 10, mapping the hover position of the pointer to the corresponding point on the user interface including:
    displaying a virtual user interface in the virtual environment corresponding to the user interface on the handheld electronic device;
    mapping the detected hover position of the finger to a corresponding point on the user interface of the handheld electronic device; and
    mapping the detected hover position of the finger and corresponding point on the user interface of the handheld electronic device to a corresponding virtual point on the virtual user interface.

12. The non-transitory computer program product of claim 11, the method further comprising displaying a virtual visual indicator visually marking the mapped corresponding virtual point on the virtual user interface.

13. The non-transitory computer program product of claim 11, setting the mapped point on the user interface at the determined initiation of movement of the pointer as the selection point on the user interface of the handheld electronic device including:
    detecting a movement of the finger from the hover position toward the user interface on the handheld electronic device;
    setting the mapped point on the user interface of the handheld electronic device at the determined initiation of movement of the pointer as the selection point on the user interface of the handheld electronic device; and
    mapping the selection point on the user interface of the handheld electronic device to a corresponding virtual selection point on the virtual user interface.

14. The non-transitory computer program product of claim 9, registering the user input corresponding to the selection point in response to the detected contact of the pointer with the user interface including:
    storing the tracked hover positions of the pointer;
    determining the hover position of the pointer at a set interval of time before detecting the contact of the pointer with the user interface based on the stored tracked hover positions of the pointer, and designating the determined hover position and a corresponding mapped point on the user interface as the selection point on the user interface; and
    registering the user input corresponding to the selection point in response to the detected contact of the pointer at the actual contact point with the user interface, the actual contact point being different from the selection point on the user interface.

15. The non-transitory computer program product of claim 9, tracking the hover position of a pointer within a detecting zone with respect to the user interface including detecting and tracking a hover position of a hand within a detection zone of a virtual user interface displayed by a head mounted display device, the head mounted display device also displaying a virtual environment.

16. The non-transitory computer program product of claim 15, registering the user input corresponding to the selection point in response to the detected contact of the pointer with the user interface including:
- detecting a virtual contact between the hand and a virtual contact point on the virtual user interface, the virtual contact point being different from a virtual selection point on the virtual user interface; and
- registering the user input corresponding to the virtual selection point on the user interface in response to the detected virtual contact at the virtual contact point, the virtual selection point corresponding to a hover position of the hand with respect to the virtual user interface at which a movement of the hand toward the virtual user interface is detected.

* * * * *